US006658358B2

United States Patent
Hao et al.

(10) Patent No.: US 6,658,358 B2
(45) Date of Patent: Dec. 2, 2003

(54) METHOD AND SYSTEM FOR COMPUTING FORCES ON DATA OBJECTS FOR PHYSICS-BASED VISUALIZATION

(75) Inventors: Ming C. Hao, Palo Alto, CA (US); Umeshwar Dayal, Saratoga, CA (US); Meichun Hsu, Los Altos Hills, CA (US); Thomas Holenstein, Zuerich (CH); Markus Gross, Uster (CH)

(73) Assignee: Hewlett-Packard Development Company, L.P., Houston, TX (US)

( * ) Notice: Subject to any disclaimer, the term of this patent is extended or adjusted under 35 U.S.C. 154(b) by 23 days.

(21) Appl. No.: 10/138,875

(22) Filed: May 2, 2002

(65) Prior Publication Data

US 2003/0208323 A1 Nov. 6, 2003

(51) Int. Cl.[7] .............................................. G06F 19/00
(52) U.S. Cl. ........................................................ 702/41
(58) Field of Search ......................... 73/382 R, 382 G, 73/862.041; 345/419; 702/41; 703/6

(56) References Cited

U.S. PATENT DOCUMENTS 5,493,919 A * 2/1996 Frank et al. ........... 73/862.041
5,596,511 A * 1/1997 Toyoda et al. ................. 702/41
5,625,575 A * 4/1997 Goyal et al. .................... 703/6

FOREIGN PATENT DOCUMENTS

JP 06-231115 * 8/1994 ........... G06F/15/20

OTHER PUBLICATIONS

Hao, M; Dayal, U; Hsu,M; Baker, J; D'Eletto, R;"A Java–Based Visual Mining Infrastructure And Applications"; Proceedings IEEE Symposium On Information Visualization; Oct. 24–29, 1999; pp 124–127.*

Sprenger, T; Brunella, R; Gross, M;"H–BLOB: A Hierarchical Visual Clustering Stearing Method Using Implicit Surfaces";Proceedings Visualization 2000; Oct. 8–13, 2000; pp 61–68.*

Ankerst, M; Berchtold, S; Keim, D;"Similarity Clustering Of Dimensions For An Enhanced Visualization Of Multidimensional Data";Proceedings IEEE Symposium On Information Visualization; Oct. 19–20, 1998; pp 52–60.*

Salmon, J;"Parallel N Log N N–Body Algorithms And Applications To Astrophysics";Compcon Spring 91 Digest of papers; Feb. 25–Mar 1, 1991; pp 73–78.*

Featherstone, R; Fijany, A;"A Technique For Analyzing Constrained Rigid–Body Systems, And Its Application To The Constant Force Algorithm";IEEE Transactions On Robotics And Automation; vol. 16 Issue 6; Dec. 1999; pp 1140–1144.*

Gross, M; Sprenger, T; Finger, J;"Visualizing Information On A Sphere"; Proceedings IEEE Symposium On Information Visualization; Oct. 20–21 1997; pp 11–16.*

Sprenger, T; Gross, M; Biesler, D; Strasser, T;"Ivory—An Object–Oriented Framework For Physics–Based Information Visualization In Java";Proceedings IEEE Symposium On Information Visualization; Oct. 19–20, 1998; pp 79–86.*

Josh Barnes, et al.; "A Hierachical O(N Log N) Force·Calculation Algorithm"; Nature vol. 324, Dec. 4, 1986; pp. 446–449.

* cited by examiner

*Primary Examiner*—John Barlow
*Assistant Examiner*—Douglas N Washburn

(57) ABSTRACT

A method and system thereof for computing forces on data objects in a physics-based visualization system are described. First forces exerted on a data object by other data objects in the plurality are determined without considering the similarity between data objects. Second forces exerted on the data object by a portion of the other data objects, each data object in the portion having a degree of similarity to the data object, are determined considering the similarity between data objects. The first forces are adjusted using the second forces to determine a net force on the data object. The net force is thus determined without having to consider similarity between all data objects in the plurality.

19 Claims, 7 Drawing Sheets

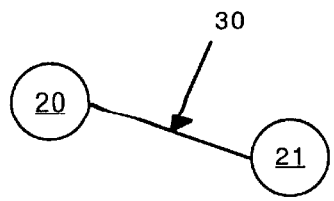
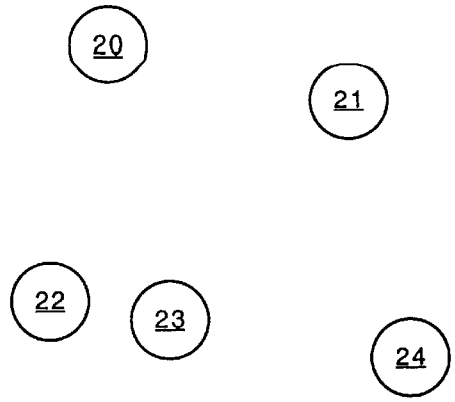
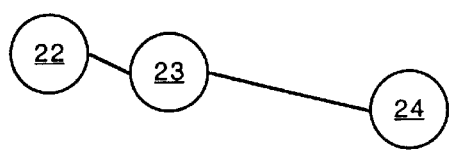
Figure 2A
Figure 2B
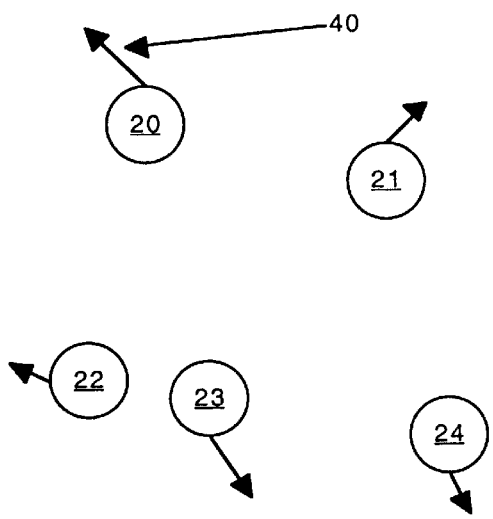
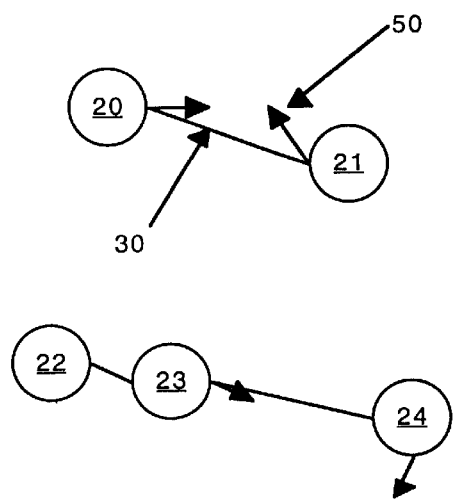
Figure 2C
Figure 2D

300

METHOD AND SYSTEM FOR COMPUTING FORCES ON DATA OBJECTS FOR PHYSICS-BASED VISUALIZATION

TECHNICAL FIELD

The present invention relates to a method and system for visualizing data and data objects. More specifically, the present invention pertains to a method and system for computing forces on data objects in physics-based visualization techniques.

BACKGROUND ART

The analysis of data objects can be facilitated by displaying them in multi-dimensional space. By displaying data objects in this manner, it is easier to visualize the relationships between the data objects while preserving the essential information in the data.

One technique known in the art for computing the layout of data objects in multi-dimensional space is generally referred to as a physics-based visualization system. Data objects are positioned in "space" according to how strongly the data objects are related. The relationship between data objects is characterized according to their "similarity" or "confidence level" and their "support." Similarity (confidence level) and support are best defined by way of a market basket example: if 85 percent of the customers who bought a printer also bought paper, and 10 percent of all customers bought both a printer and paper, then similarity is 85 percent and support is 10 percent. Note that similarity is directional; that is, although 85 percent of the customers who bought a printer also bought paper, it is not necessarily true that 85 percent of the customers who bought paper also bought a printer.

In multi-dimensional space, the distance between a pair of data objects indicates their degree of support; the closer the objects, the greater their degree of support. The similarity between data objects is represented by a "link" or an "edge" between the objects. A link or edge is essentially a line between two data objects that have a degree of similarity that is greater than zero. The color of the link (edge) can be used to indicate the degree of similarity. Also, the link may include an arrow to show the direction of the association.

Physics-based visualization systems execute in a known manner to place data objects such that the distance between any two data objects is indicative of the degree of support between those two objects. Much as stars and planets exert forces on each other in astrophysical space, data objects in visualization space can be thought of as exerting "forces" on each other. In essence, these forces should be proportionate with the degree of support between each data object and the other data objects in the system. Data objects with higher degrees of support should exert higher forces on each other and thus should be placed closer together.

Thus, in a physics-based visualization system, one of the key procedures for determining the final placement of data objects is to calculate the forces applied to each data object by the other data objects in the system. To calculate the force for every data object, the simplistic approach is to compute the force for every possible pairing of data objects, and sum the results. However, this would result in a run time on the order of $N^2$ for a system of N data objects. Thus, the simplistic approach is computationally very expensive and can take a long time to complete, and so it is desirable to find a more efficient way of calculating the forces applied to each data object.

In astrophysics, techniques known in the art can be used to accelerate the force computations. One such technique, referred to herein as "Barnes-Hut," is described in J. E. Barnes and P. Hut (1986), "A Hierarchical O(N log N) Force-Calculation Algorithm," Nature, 324(6270) (pages 446–449), hereby incorporated by reference. Instead of a run time on the order of $N^2$, the Barnes-Hut technique reduces run time to the order of N log N.

Techniques such as Barnes-Hut generally represent objects that are far away as a single, heavier object. For example, to calculate the force of a distant galaxy on a single star, the force is calculated considering the galaxy as a whole, rather than by calculating the force exerted by each individual star in the galaxy and summing the results.

In astrophysics, the force between objects is a function of the distance between the objects, and so the approximations introduced by Barnes-Hut can be readily applied. However, in physics-based visualization systems, the force between data objects is a function not only of the distance between objects (their degree of support), but also the similarity between objects. Because forces in a physics-based visualization system are dependent on both the distance between data objects and the similarity of the data objects, applying a computationally efficient force computation technique such as Barnes-Hut is problematic. This problem is illustrated by Prior Art FIG. 1.

Prior Art FIG. 1 shows data objects 10, 12, 14, 16 and 18 represented in two-dimensional space. Here, similarity between data objects is represented as a normalized value between zero and one, with a value of zero indicating that there is no similarity and a value of one indicating the maximum degree of similarity. The object pairs 10 and 12, 14 and 16, and 16 and 18 each have a degree of similarity greater than (not equal to) zero, while the other object pairs (e.g., 10 and 14, 10 and 16, and so on) have a degree of similarity equal to zero. In FIG. 1, a line (e.g., a link or edge) between data objects indicates that they are similar to some degree, while the absence of a line indicates a similarity of zero.

When calculating the force exerted on data object 12 using the Barnes-Hut technique, for example, data objects 14 and 16 can be represented as a single object, because these objects are far enough away from data object 12 while relatively close to each other. When calculating the force exerted on data object 18, it is desirable to employ the same optimization; that is, it is desirable to represent data objects 14 and 16 as a single object. However, because in physics-based visualization systems the force between data objects is a function not only of the distance between objects but also the similarity between objects, the force exerted by data objects 14 and 16 on data object 12 are different from the force exerted by data objects 14 and 16 on data object 18. Thus, application of computationally efficient force computation techniques such as Barnes-Hut to physics-based visualization systems is problematic because techniques such as Barnes-Hut implement optimizations that are dependent only on the distance between objects while physics-based visualization systems are dependent on more than one parameter (e.g., distance and similarity).

Accordingly, what is needed is a method and/or system for accelerating calculations of force in physics-based visualization systems. What is also needed is a method and/or system that can satisfy this need and that can account for the similarity between data objects. The present invention provides a novel solution to these needs.

DISCLOSURE OF THE INVENTION

A method and system thereof for computing forces on data objects in a physics-based visualization system are described. First forces exerted on a data object by other data objects in the plurality are determined without considering the similarity between data objects. Second forces exerted on the data object by a portion of the other data objects, each data object in the portion having a degree of similarity to the data object, are determined considering the similarity between data objects. The first forces are adjusted using the second forces to determine a net force on the data object. The net force is thus determined without having to consider similarity between all data objects in the plurality.

BRIEF DESCRIPTION OF THE DRAWINGS

The accompanying drawings, which are incorporated in and form a part of this specification, illustrate embodiments of the invention and, together with the description, serve to explain the principles of the invention:

PRIOR ART

FIG. 2A illustrates data objects in multi-dimensional space in accordance with one embodiment of the present invention.

FIG. 2B illustrates data objects in multi-dimensional space with similarities set to zero in accordance with one embodiment of the present invention.

FIG. 2C illustrates forces on data objects in multi-dimensional space, in which the forces are calculated with similarities set to zero in accordance with one embodiment of the present invention.

FIG. 2D illustrates forces on data objects in multi-dimensional space, in which the forces are corrected to account for similarities in accordance with one embodiment of the present invention.

BEST MODE FOR CARRYING OUT THE INVENTION

Figure 1:
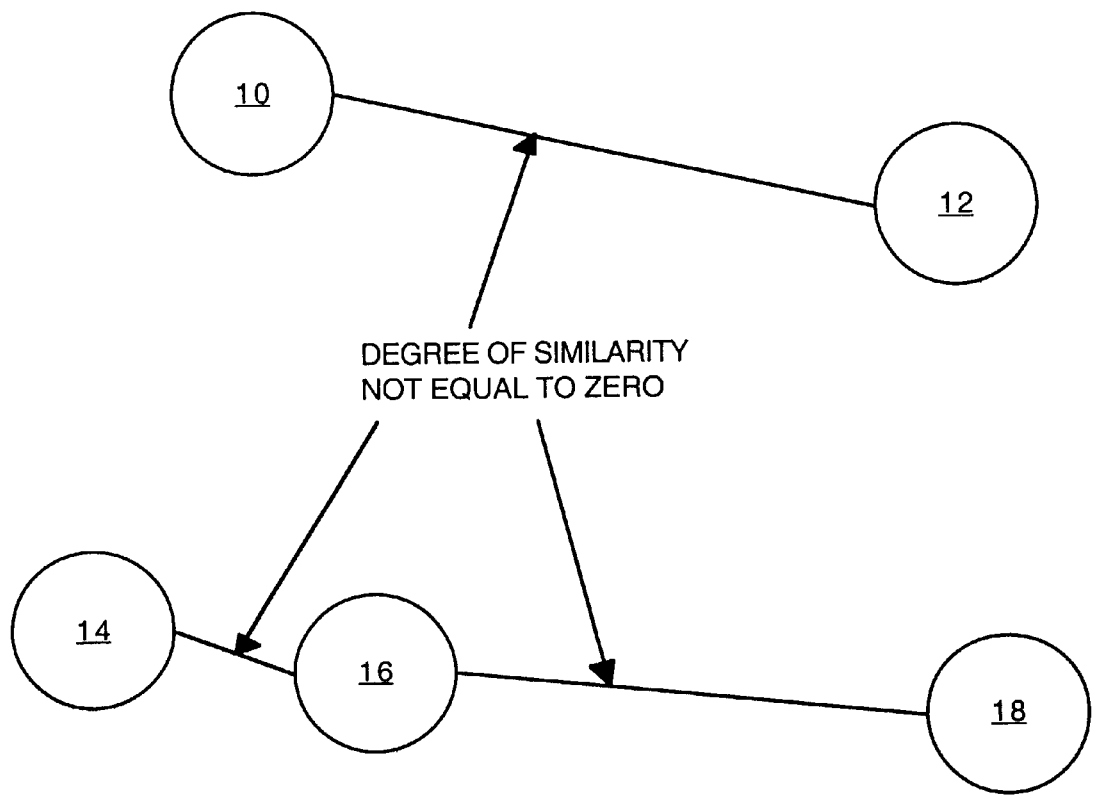
FIG. 1 shows data objects in multi-dimensional space.

Embodiments of the present invention provide a method and system for accelerating calculations of force in physics-based visualization systems. Embodiments of the present invention also provide a method and system that can account for the similarity between data objects.

Embodiments of the present invention generally pertain to a two-pass procedure including a prediction step and a correction step. In the prediction step, the forces exerted on data objects by other data objects are calculated without considering the degree of similarity between the objects. As such, a technique that accelerates force computations (such as but not limited to Barnes-Hut) can be used in the prediction step.

In the correction step, forces are calculated for those data object pairs that have a certain (e.g., specified) degree of similarity, using a function that considers the similarity between data objects. These forces are used with the forces calculated in the prediction step to determine the actual forces on the data objects. For those data object pairs that have the specified degree of similarity, the forces calculated in the prediction step are subtracted and the forces calculated in the correction step are added.

In its various embodiments, the present invention can reduce the overall computational effort while striking an appropriate balance with accuracy. Suppose there are N data objects, and M pairs of data objects having the specified degree of similarity. A conventional approach (not utilizing the present invention) requires explicit force calculations for all N data objects and a computational effort on the order of $N^2$. According to one embodiment of the present invention, the computational effort is reduced to on the order of N log N (for the calculations performed using Barnes-Hut) plus M (for the explicit force calculations for the M pairs of data objects having the specified degree of similarity). The value of M can be varied by changing the value of the specified degree of similarity; by specifying a lower threshold for the degree of similarity, the value of M will increase. The threshold can be specified by a user to achieve a desired balance between computational speed and accuracy.

FIG. 2A illustrates data objects 20, 21, 22, 23 and 24 in multi-dimensional space in accordance with one embodiment of the present invention. It is understood that although five data objects are illustrated in two-dimensional space, other than five data objects may be used and that other than two dimensions may be used in accordance with the present invention.

A non-zero degree of similarity between data objects can be indicated using a "link" or an "edge." In FIG. 2A, for example, link 30 is used to indicate that data objects 20 and 21 have a degree of similarity other than zero. Typically, similarity is normalized to a value between zero and one, so that data objects that have a maximum degree of similarity have a similarity equal to one, while a degree of similarity equal to zero indicates that the data objects are dissimilar. A degree of similarity not equal to (greater than) zero and less than one indicates that the data objects have some similarity. It is appreciated that the present invention can be used with other measures of similarity that may or may not be normalized.

In one embodiment, a threshold value can be defined such that pairs of data objects having a degree of similarity less than the threshold value can be considered to be dissimilar (e.g., they can be assumed to have a similarity value of zero). In this embodiment, a link or edge (e.g., link 30) can be used to indicate that two data objects (e.g., data objects 20 and 21) have a degree of similarity greater than (or greater than or equal to) the threshold value. As will be seen, when used with the various embodiments of the present invention, a threshold value can be specified by a user to achieve a desired balance between computational speed and accuracy; that is, a higher threshold value will likely increase the speed of the computations but accuracy may be affected.

In the example of FIG. 2A, data object pairs 20 and 21, 22 and 23, and 23 and 24 have a degree of similarity greater than zero, while each of the other data object pairs (e.g., 20 and 22, 20 and 23, 20 and 24, 21 and 22, 21 and 23, 21 and 24, and 22 and 24) have a degree of similarity equal to zero. As mentioned above, in one embodiment, these latter pairs of data objects may have a degree of similarity not equal to zero but less than a threshold value, while the former pairs of data objects may have a degree of similarity greater than the threshold value.

FIG. 2B illustrates data objects 20–24 in multi-dimensional space with similarities set to zero in accordance with one embodiment of the present invention. By assuming the similarities are all equal to zero, the forces on the data objects can be calculated by applying a computationally efficient force computation technique such as Barnes-Hut. It is understood that another computationally efficient force computation technique such as a fast multipole expansion (FME) technique may be used in accordance with the present invention. Such techniques are known in the art.

FIG. 2C illustrates forces (exemplified by 40) on data objects 20–24 in multi-dimensional space, in which the forces are calculated with similarities set to zero using a technique such as Barnes-Hut, in accordance with one embodiment of the present invention.

FIG. 2D illustrates forces on data objects 20–24 in multi-dimensional space, in which the forces (exemplified by 50) are corrected to account for similarities in accordance with one embodiment of the present invention. In one embodiment, this is accomplished by updating the forces for those links having a non-zero degree of similarity (or a degree of similarity greater than the threshold). This is explained more fully in conjunction with FIGS. 3 and 4, below.

Figure 3A:
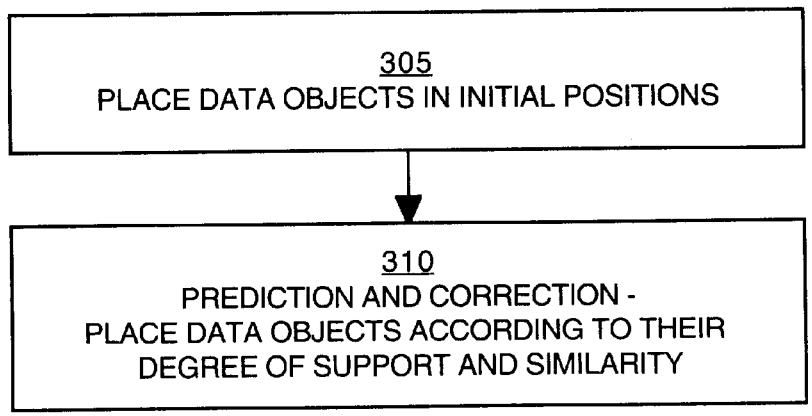
FIGS. 3A and 3B are flowcharts showing a process for force computation in a physics-based visualization technique according to one embodiment of the present invention.

FIG. 3A is a flowchart 300 showing a process for force computation in a physics-based visualization technique according to one embodiment of the present invention. Flowchart 300 includes processes of the present invention that, in one embodiment, are carried out by a processor under the control of computer-readable and computer-executable instructions. The computer-readable and computer-executable instructions reside, for example, in data storage features such as computer usable volatile memory, computer usable non-volatile memory, and/or a data storage device.

In step 305, in the present embodiment, data objects are placed into initial positions in a rendering of multi-dimensional space. In one embodiment, the data objects are placed in equally spaced positions as if on a spherical surface. Alternatively, the data objects can be randomly placed within the multi-dimensional space.

In step 310, in the present embodiment, data objects are placed according to their relative degree of support and similarity. The data objects are placed such that the distance between two data objects indicates the degree of support between the two objects. A directional arrow can be added between pairs of similar data objects that have a non-zero degree of similarity or a degree of similarity greater than some other threshold. Step 310 includes essentially prediction steps and a correction step, described further in conjunction with FIG. 3B.

Figure 3B:
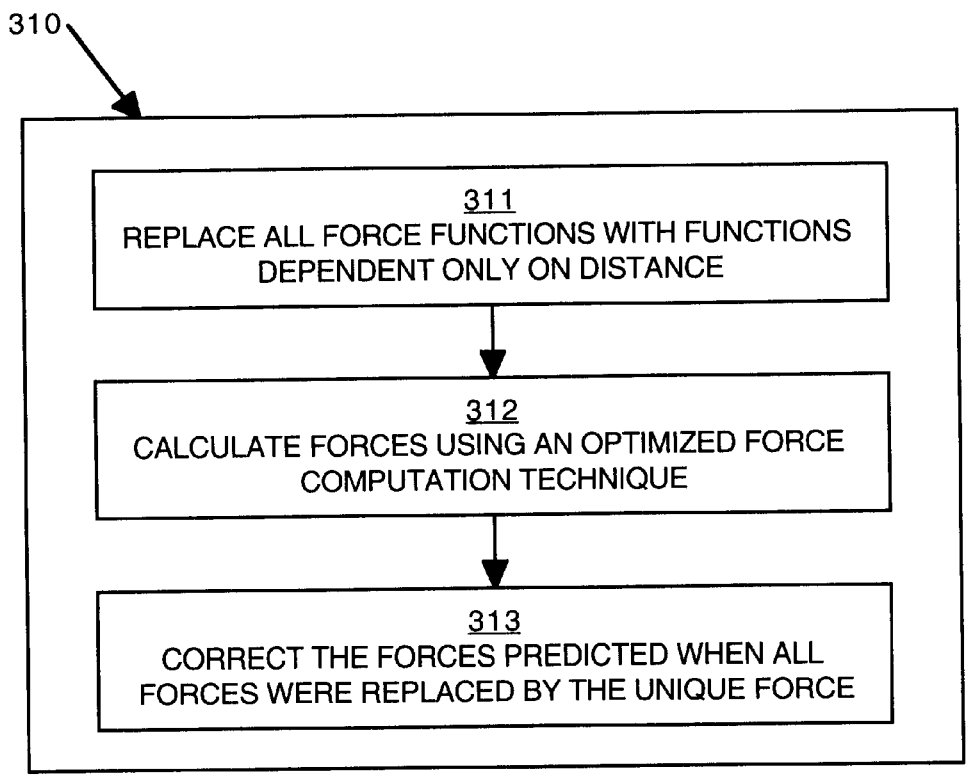

FIG. 3B is a flowchart further describing step 310 of FIG. 3A according to one embodiment of the present invention. In this embodiment, steps 311 and 312 are essentially prediction steps and step 313 is essentially a correction step. In steps 311 and 312, similarity is assumed to be zero for all links. Step 313 corrects for this assumption by updating the forces for those links in which similarity is not equal to zero (or in which similarity is greater than a specified threshold value).

In step 311, in the present embodiment, force functions are replaced with functions that only depend on distance. Because energy is defined as the integral of force over space (or length or distance), it is recognized that force can also be derived as the gradient of a function for calculating energy. It is appreciated that there may be other types of functions used to calculate force, either directly or indirectly. In general, in accordance with the present embodiment of the present invention, the function or functions that are used to derive or calculate force in a physics-based visualization technique, either directly or indirectly, are replaced with a function that is dependent solely on the distance between data objects. This function may be different from the function used in the correction step (step 313). Alternatively, a function dependent on both distance and similarity may be used; however, similarity values of zero are used as inputs, or the coefficient of the similarity term can be set to zero. By calculating the forces using a function that does not consider similarity, the force calculation is amenable to the use of Barnes-Hut, FME, and the like.

In step 312, according to the present embodiment of the present invention, the forces on data objects are calculated based on the simplifying assumptions introduced according to Barnes-Hut, FME, or another such technique known in the art. These techniques typically have a computational run time on the order of N or of N log N, where N represents the number of data objects.

In the present embodiment, step 313 is performed only for those links for which similarity is not equal to zero (or those links with similarity greater than the specified threshold value). In step 313, an explicit force calculation dependent on both distance and similarity is performed for those links with similarity greater than zero (or greater than the threshold). For each such link, the force calculated in step 312 (as if the link had zero similarity) is subtracted, and the actual force from the explicit force calculation is added.

In the present embodiment, if M is the number of links with similarity other than zero (or above the threshold value), then the correction step (step 313) is only performed for M links. It is generally true that M is much less than N(N−1)/2.

Note that the threshold value can be defined to achieve a desired value for M. In effect, the value of the threshold (and hence the value of M) determines the amount by which the estimated forces (from step 312) need to differ from the actual forces in order to be considered in the correction step (step 313). For a higher threshold value (and therefore, a smaller M), there is a greater difference between the estimated forces and the actual forces. That is, by increasing the threshold value, a greater number of data object pairs will have their actual forces replaced with forces that are dependent only on distance.

Because the present embodiment of step 313 only involves M links, the computational run time is on the order of M. Accordingly, the total run time associated with the present embodiment is on the order of N plus M, or of N log N plus M, depending on the optimization technique used in step 312. In one embodiment, further computational efficiency can be achieved by adjusting the parameter θ in Barnes-Hut (the parameter θ controls the granularity of the calculation in Barnes-Hut in a known manner). In general, by adjusting the values of M and/or θ, the user can achieve a desirable balance between computational accuracy and speed.

Figure 4:
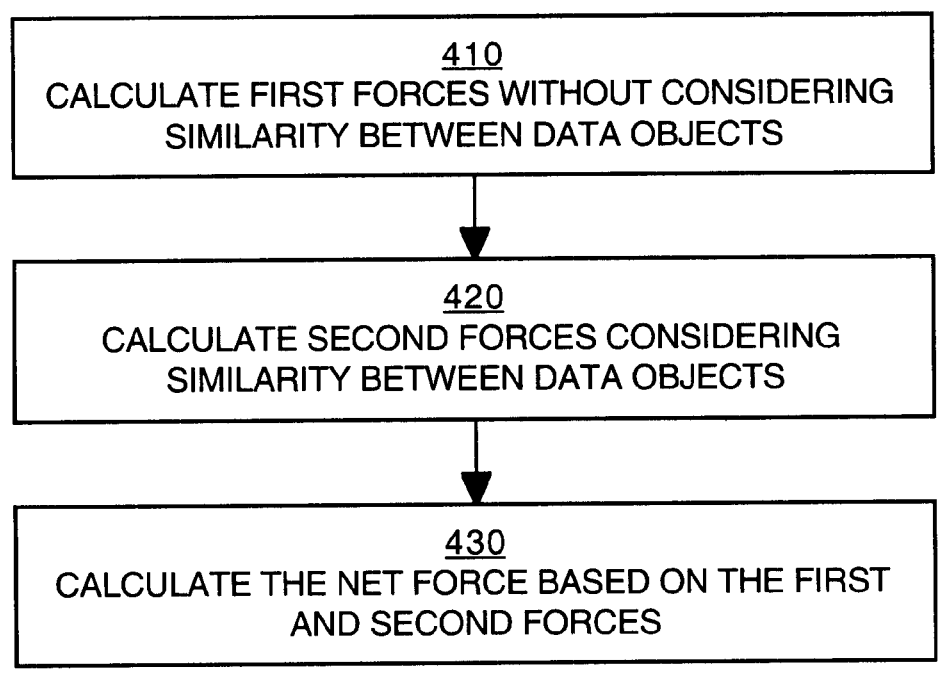
FIG. 4 is a flowchart of a method for calculating forces on data objects in accordance with one embodiment of the present invention.

FIG. 4 is a flowchart 400 of a process for calculating forces on data objects in a physics-based visualization system in accordance with one embodiment of the present invention. Flowchart 400 includes processes of the present invention that, in one embodiment, are carried out by a processor under the control of computer-readable and computer-executable instructions. The computer-readable and computer-executable instructions reside, for example, in data storage features such as computer usable volatile memory, computer usable non-volatile memory, and/or a data storage device.

In step 410, according to the present embodiment of the present invention, forces are calculated for data objects in the physics-based visualization system according to the distance between the data objects and without considering the similarity between the data objects. These forces are referred to herein as "first forces" to distinguish them from the forces that are calculated as a function of both the distance and similarity between data objects. These latter forces are referred to herein as "second forces."

In the present embodiment, the first forces are calculated by assuming that all of the data object pairs have a similarity of zero. In one embodiment, this is accomplished by setting all values of similarity to zero. Alternatively, functions for calculating the first forces as a function of only distance can be derived from functions that are known in the art. In one embodiment, if the function being used to calculate forces includes a similarity term, the similarity term is zeroed out (for example, the coefficient of the similarity term is set equal to zero) to remove this term from the function. Thus, according to the present embodiment of the present invention, the first forces can be calculated using the simplifying assumptions introduced according to Barnes-Hut, FME, or another technique known in the art. That is, by calculating the first forces without considering similarity, the force calculation is amenable to the use of Barnes-Hut, FME, and the like.

In step 420, in the present embodiment, second forces are calculated for those data object pairs that have a degree of similarity not equal to zero or that is greater than a specified threshold value. It is important to note that, in the present embodiment, the second forces are only calculated for a subset of the total set of data object pairs. For example, with reference back to FIG. 2A, second forces are calculated only for the data object pairs 20 and 21, 22 and 23, and 23 and 24.

In the present embodiment, the second forces are calculated using a function that considers similarity between data objects. In one embodiment, a function that is dependent on both the distance between data objects and their similarity is used. Such functions are known in the art. The function used to calculate the second forces may be the same function as that used in step 410 (before the similarity terms are zeroed out). Alternatively, the function used to calculate the second forces may a different function than that used in step 410; that is, the function of step 410 may be a first function dependent only on the distance between data objects, and the function of step 420 may be a second function different from the first function in that the second function is dependent on both distance and similarity.

In step 430, in the present embodiment, the net forces on each data object are calculated using the first forces and the second forces, considering the similarity between data objects. When there is a degree of similarity between two data objects, the first force (the force that is a function only of distance) is subtracted, and the second force (the force that is a function of distance and similarity) is added.

With reference back to FIGS. 2A through 2D, one embodiment of the present invention is illustrated for data objects 21 and 24. According to the present embodiment, first forces (as in step 410 of FIG. 4) are calculated for data objects 21 and 24 without considering similarity (e.g., by setting similarity to zero). As such, the simplifying assumptions of Barnes-Hut (or like techniques) can be used to calculate the first forces. In the example of FIG. 2B, data objects 22 and 23 can be treated as a single object for the calculations of first forces (dependent only on distance) exerted on data objects 21 and 24. That is, using Barnes-Hut for example, the first forces exerted on data object 21 are due to the forces exerted by data objects 20 and 24 and by a "superobject" representing data objects 22 and 23. Similarly, the first forces exerted on data object 24 are due to the forces exerted by data objects 20 and 21 and by a superobject representing data objects 22 and 23.

Next, according to the present embodiment, second forces dependent on both distance and similarity are calculated for the data object pairs that have a degree of similarity greater than zero (or greater than the threshold). Continuing the example from the preceding paragraph, in which the method of the present invention is illustrated for data objects 21 and 24, the second forces would include the force exerted by data object 20 on data object 21, the force exerted by data object 22 on data object 24, and the force exerted by data object 23 on data object 24.

Then, according to the present embodiment, the net forces on data objects 21 and 24 are determined. For data object 21, the first force (dependent only on distance) exerted on data object 21 by data object 20 is subtracted, and the second force (dependent on distance and similarity) exerted on data object 21 by data object 20 is added. Thus, the net force on data object 21 includes the first force from data objects 22 and 23 (treated as a superobject according to Barnes-Hut), the first force from data object 24, and the second force from data object 20. Similarly, the net force on data object 24 includes the first force from data object 20, the first force from data object 21, the second force from data object 22, and the second force from data object 23.

Thus, in accordance with the present invention, a portion of the data objects can be modeled as superobjects using techniques such as Barnes-Hut, reducing the total number of explicit force calculations that need to be performed and thereby reducing the run time needed to place data objects in a physics-based visualization system. The present invention thus provides a method and system for accelerating calculations of force in physics-based visualization systems while accounting for both the distance and the similarity between data objects.

The present invention may be utilized in a number of applications. These applications include but are not limited to: market basket analysis of the similarity of products used/purchased by consumers; customer behavior analysis of the similarity of customers; text mining in which the similarity of documents is analyzed; multi-dimensional scaling algorithms; large graph layouts of abstract, multi-dimensional graphs; and physical simulations of complex force fields in which force or other phenomena depend on more than one parameter.

Figure 5A:
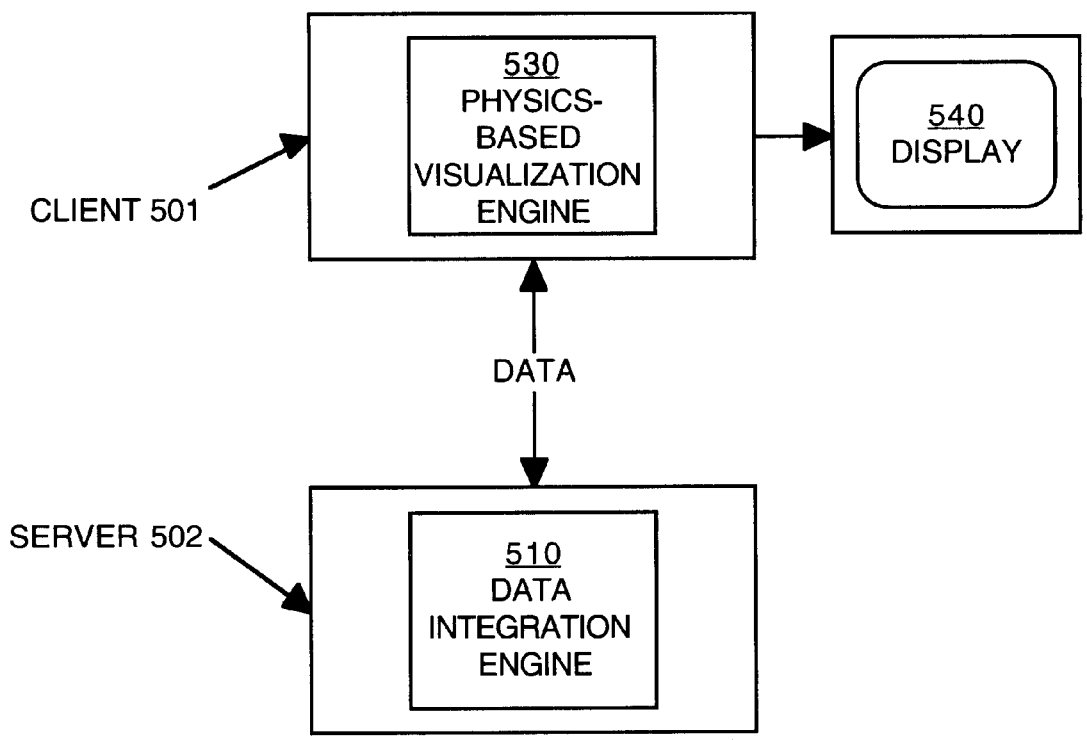
FIG. 5A is a block diagram on one embodiment of a system upon which embodiments of the present invention may be implemented.

FIG. 5A is a block diagram on one embodiment of a system 500 upon which embodiments of the present invention may be implemented. Client system 501 and server system 502 are computer systems coupled in a network in a known manner. Client 501 and server 502 may be physically in separate locations (e.g., remotely separated from each other). It is appreciated that, although only a single client and a single server are shown, the present invention can be utilized with any number of such systems.

System 500 may represent a portion of a communication network located within a firewall of an organization or corporation (an "Intranet"), or system 500 may represent a portion of the World Wide Web or Internet using any of the various network protocols. Client 501 and server 502 may also be coupled via their respective input/output ports (e.g., serial ports) or via wireless connections. In essence, client 501 and server 502 are coupled in some manner that provides the capability for them to exchange data. In the present embodiment, a physics-based visualization engine 530 is implemented on client 501 and a data integration engine 510 is implemented on server 502. However, it is appreciated that both of these functions may be implemented either on client 501 or on server 502, or that these functions may be distributed over a number of additional clients and servers (not shown).

An objective of physics-based visualization engine 530 is to generate a multi-dimensional display of data objects on display 540. Display 540 is a display device suitable for creating graphic images. A multi-dimensional display generated by physics-based visualization engine 530 provides a friendly means of visualizing the relationships between large volumes of transactional data represented by the data objects. Physics-based visualization engine 530 is further described in conjunction with FIG. 5C, below.

Continuing with reference to FIG. 5A, data integration engine 510 essentially functions to organize raw transactional data into a form that allows for further manipulation and analysis. For example, data integration engine 510 may aggregate (sum) instances of the raw data over time, eliminate duplicate entries, filter out instances of data based on specified conditions, and the like.

Figure 5B:
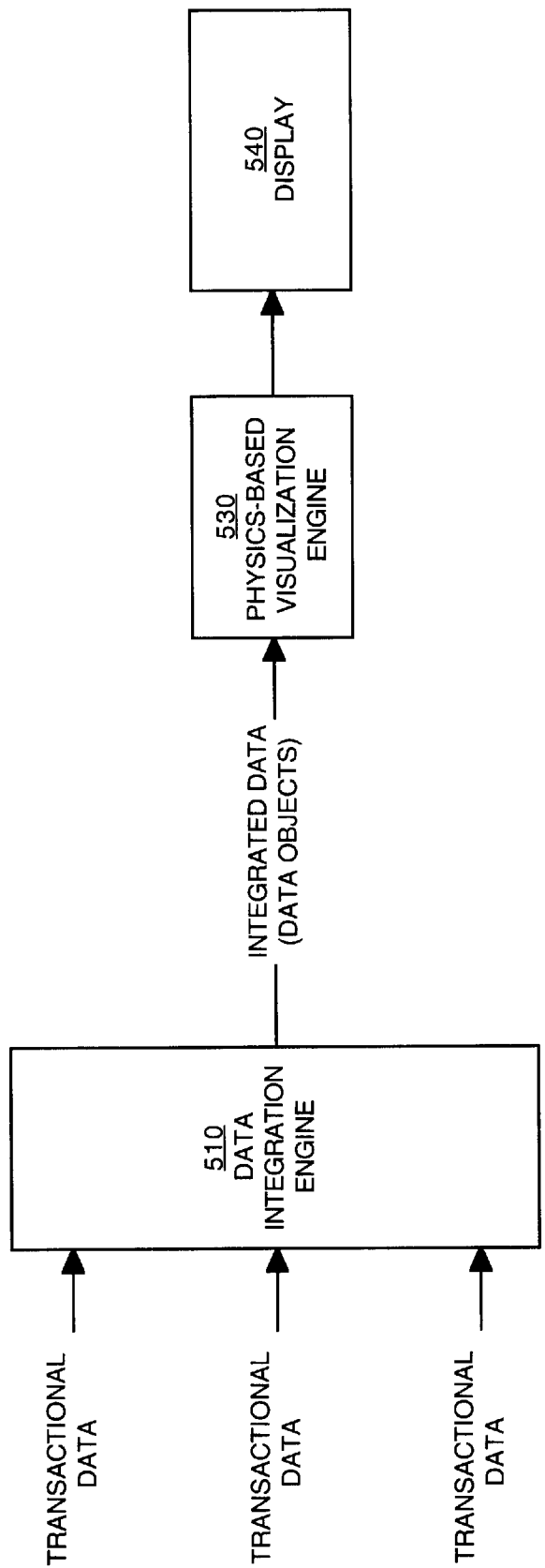
FIG. 5B illustrates data flow through a system for analyzing and visualizing data in accordance with one embodiment of the present invention.

FIG. 5B illustrates the data flow through a system 500 for analyzing and visualizing data in accordance with one embodiment of the present invention. As described by FIG. 5A, the various functions illustrated by FIG. 5B can be executed on a single device, or execution of these functions may be distributed over a number of different devices.

In FIG. 5B, transactional data include raw transactional data resulting from business and financial transactions including electronic commerce (e-commerce) transactions. The transactional data are analyzed and transformed into data objects by data integration engine 510. In the present embodiment, the data objects are further processed by physics-based visualization engine 530 to generate a multi-dimensional display of data objects on display 540.

Figure 5C:
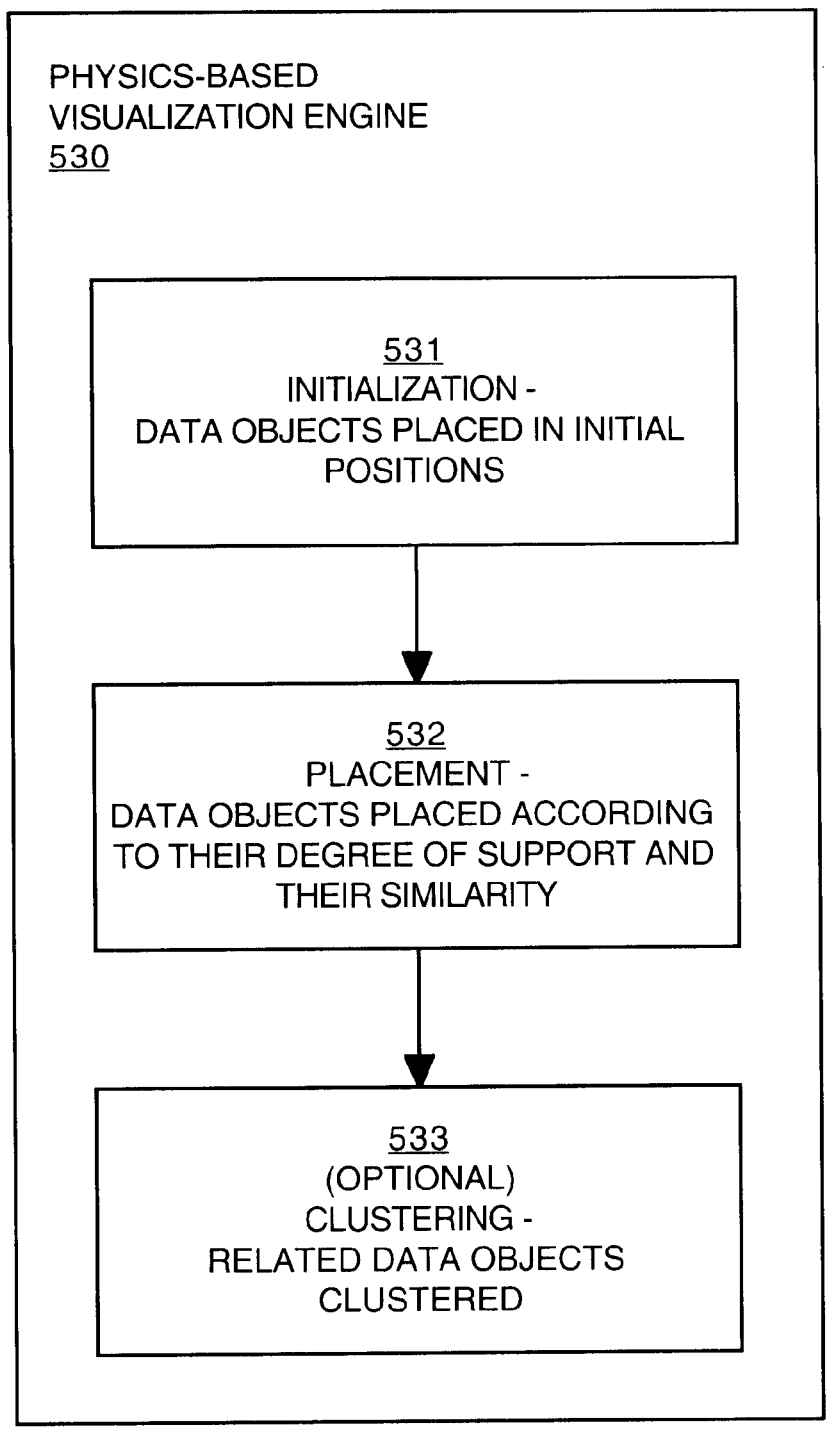
FIG. 5C illustrates one embodiment of a physics-based visualization engine for processing data objects in accordance with the present invention.

Referring now to FIG. 5C, physics-based visualization engine 530 includes an initialization module 531, a placement module 532, and an optional clustering module 533. In this embodiment, the initialization module 531 places data objects into their initial positions in a rendering of multi-dimensional space. In one embodiment, the data objects are placed in equally spaced positions as if on a spherical surface. Alternatively, the data objects can be randomly placed within the multi-dimensional space.

In the embodiment of FIG. 5C, placement module 532 moves the data objects such that the distances between any two of the data objects is indicative of the degree of support between those two objects. As described above, the degree of support between two data objects is proportionate to the force exerted by these data objects on each other. According to the present embodiment, placement module 532 uses the processes for force computation described above in conjunction with FIGS. 3A, 3B and 4, above. In one embodiment, placement module 532 adds a directional arrow between pairs of similar data objects to indicate that they have a degree of similarity that is non-zero and/or greater than a specified threshold, as described above. In another embodiment, clustering module 533 then clusters related data objects into groups.

The preferred embodiment of the present invention is thus described. While the present invention has been described in particular embodiments, it should be appreciated that the present invention should not be construed as limited by such embodiments, but rather construed according to the following claims.

What is claimed is:

1. In a physics-based visualization system having a plurality of data objects, a method for computing forces on said data objects, comprising:

determining first forces exerted on a data object by other data objects in said plurality, said first forces calculated without considering similarity between data objects;

determining second forces exerted on said data object by a portion of said other data objects, each data object in said portion having a degree of similarity to said data object, said second forces calculated considering similarity between data objects; and adjusting said first forces using said second forces to determine a net force on said data object, said net force determined without having to consider similarity between all data objects in said plurality.

2. The method as recited in claim 1 wherein said degree of similarity satisfies a threshold value.

3. The method as recited in claim 1 wherein said first forces are calculated using a function that is dependent on a similarity variable, wherein said first forces are calculated assuming said similarity variable is zero.

4. The method as recited in claim 1 further comprising:

receiving information that quantifies a degree of similarity between pairs of said data objects.

5. The method as recited in claim 1, wherein said step of adjusting comprises:

adding said second forces to said first forces; and subtracting from said first forces those first forces exerted by said portion of said other data objects.

6. A method for computing forces on data objects in a physics-based visualization system, comprising:

calculating first forces using a first function, wherein said first function does not consider similarity between data objects;

calculating second forces using a second function, wherein said second function considers similarity between data objects and wherein said second forces are calculated only for data objects having a degree of similarity to another data object; and determining a net force on a data object, said net force comprising second forces exerted on said data object by those data objects having said degree of similarity and first forces exerted on said data object by those data objects not having said degree of similarity, said net force determined without having to consider similarity between all data objects.

7. The method as recited in claim 6 wherein said degree of similarity satisfies a threshold value.

8. The method as recited in claim 6 further comprising:

receiving information that quantifies a degree of similarity between pairs of said data objects.

9. The method as recited in claim 6, wherein said method is used for physics-based visualization of said data objects.

10. A computer-usable medium having computer-readable program code embodied therein for causing a computer system to perform a method comprising:

computing first forces exerted on a data object by other data objects in said plurality, said first forces calculated without considering similarity between data objects;

computing second forces exerted on said data object by a portion of said other data objects, each data object in said portion having a degree of similarity to said data object, said second forces calculated considering similarity between data objects; and calculating a net force on said data object by adjusting said first forces using said second forces, said net force determined without having to consider similarity between all data objects in said plurality.

11. The computer-usable medium of claim 10 wherein said degree of similarity satisfies a threshold value.

12. The computer-usable medium of claim 10 wherein said first forces are calculated using a function that is dependent on a similarity variable, wherein said first forces are calculated assuming said similarity variable is zero.

13. The computer-usable medium of claim 10 wherein said computer-readable program code embodied therein causes a computer system to perform a method comprising:

receiving information that quantifies a degree of similarity between pairs of said data objects.

14. The computer-usable medium of claim 10 wherein said method is used for physics-based visualization of said data objects.

15. The computer-usable medium of claim 10 wherein said computer-readable program code embodied therein causes a computer system to perform a method comprising:

adding said second forces to said first forces; and subtracting from said first forces those first forces exerted by said portion of said other data objects.

16. A computer-usable medium having computer-readable program code embodied therein for causing a computer system to perform a method comprising:

generating first forces using a first function, wherein said first function does not consider similarity between data objects;

generating second forces using a second function, wherein said second function considers similarity between data objects and wherein said second forces are calculated only for data objects having a degree of similarity to another data object; and calculating a net force on a data object, said net force comprising second forces exerted on said data object by those data objects having said degree of similarity and first forces exerted on said data object by those data objects not having said degree of similarity, said net force determined without having to consider similarity between all data objects.

17. The computer-usable medium of claim 16 wherein said degree of similarity satisfies a threshold value.

18. The computer-usable medium of claim 16 wherein said computer-readable program code embodied therein causes a computer system to perform a method comprising:

receiving information that quantifies a degree of similarity between pairs of said data objects.

19. The computer-usable medium of claim 16, wherein said method is used for physics-based visualization of said data objects.

* * * * *